Figure 1:
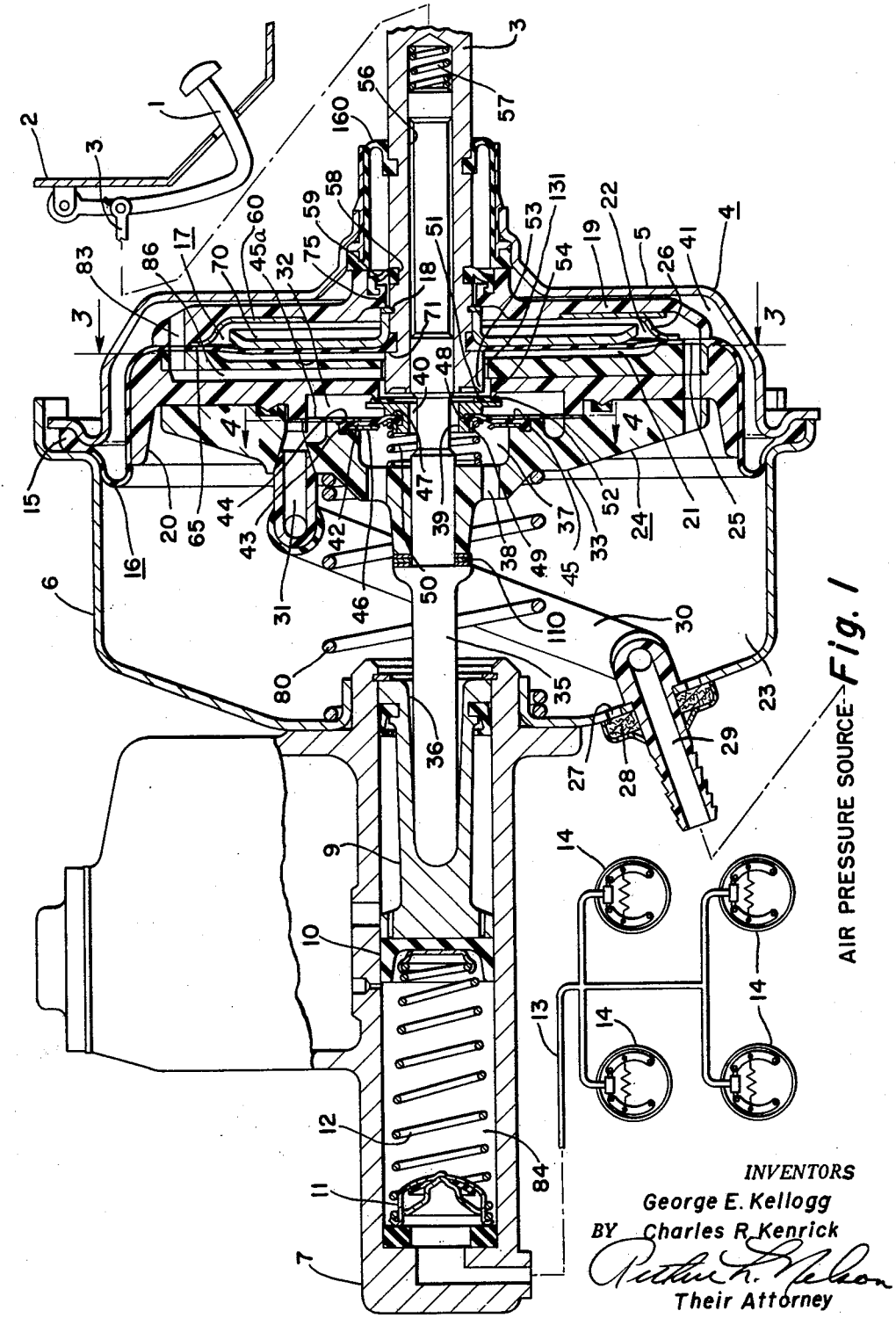

Oct. 9, 1962  G. E. KELLOGG ETAL  3,057,332
BRAKE BOOSTER UNIT
Filed July 29, 1960  3 Sheets-Sheet 1

INVENTORS
George E. Kellogg
BY  Charles R. Kenrick
Their Attorney

INVENTORS
George E. Kellogg
Charles R. Kenrick
BY
Their Attorney

Oct. 9, 1962    G. E. KELLOGG ETAL    3,057,332
BRAKE BOOSTER UNIT

Filed July 29, 1960    3 Sheets-Sheet 3

INVENTORS
George E. Kellogg
BY Charles R. Kenrick

Their Attorney

United States Patent Office 3,057,332
Patented Oct. 9, 1962

3,057,332
BRAKE BOOSTER UNIT
George E. Kellogg, Miamisburg, and Charles R. Kenrick, Waynesville, Ohio, assignors to General Motors Corporation, Detroit, Mich., a corporation of Delaware
Filed July 29, 1960, Ser. No. 46,132
8 Claims. (Cl. 121—41)

This invention relates to a brake booster unit, and more particularly, to a reaction means for a booster unit.

In the development of the brake booster unit considerable effort has been devoted toward developing a power wall of minimum weight and yet retain adequate strength for the operation required in a booster unit. The use of a plastic for the rigid portion of the power wall provides the light-weight construction necessary, however, certain portions of the power wall must be reinforced to provide the adequate strength.

In the construction of a power wall it is well to use metal parts where greater strength is required as in the reaction means. Accordingly, this invention utilizes a diaphragm reaction means operating against a metallic reaction plate. The diaphragm backing plate is also used in combination with the reaction plate and by varying the size of the diaphragm reaction plate and the diaphragm backing plate a convenient means for changing the reaction force transmitted to the manually operated means is available.

The mechanical advantage of the brake pedal of various motor vehicles is not of a constant ratio and therefore the provision for changing the reaction force transmitted to the brake pedal is a valuable feature.

It is an object of this invention to provide the rigid supporting portion for the inner periphery of the diaphragm constructed of a plastic material.

It is another object of this invention to employ an air reaction means utilizing a reaction compartment containing a reaction diaphragm transmitting a force to a reaction plate.

It is a further object of this invention to provide a reaction diaphragm in combination with a replaceable diaphragm backing plate, and a replaceable reaction plate which may readily change to vary the reaction force transmitted to the manually operating means.

The objects of this invention are accomplished by employing a rolling diaphragm which is sealed on its outer periphery within the power unit casing. The inner periphery of the rolling diaphragm is connected to an air valve member to form a seal at this point. The rigid portion of the power wall containing the valve structure and the reaction means forms a reaction compartment which receives the diaphragm through the intermediate portion. The diaphragm transmits the reaction force to a reaction plate. The reaction plate is mounted on the outer periphery of the air valve member for transmitting the force to the manual operating means.

The rigid portion of the power wall is constructed of a plastic material in such a manner that the plastic provides an adequate strength for operating the master piston within the master cylinder. The reaction forces are transmitted to the reaction compartment in response to the degree of pressurization within the booster unit. This force in turn is in direct proportion to the pressurization within the master cylinder and is transmitted directly to the manual operating means. In this manner, a power wall having the minimum weight is constructed to provide adequate strength for operation of the vehicle brakes.

Further objects and advantages of the present invention will be apparent from the following description, reference being had to the accompanying drawings wherein preferred embodiments of the present invention are clearly shown.

Figure 2:
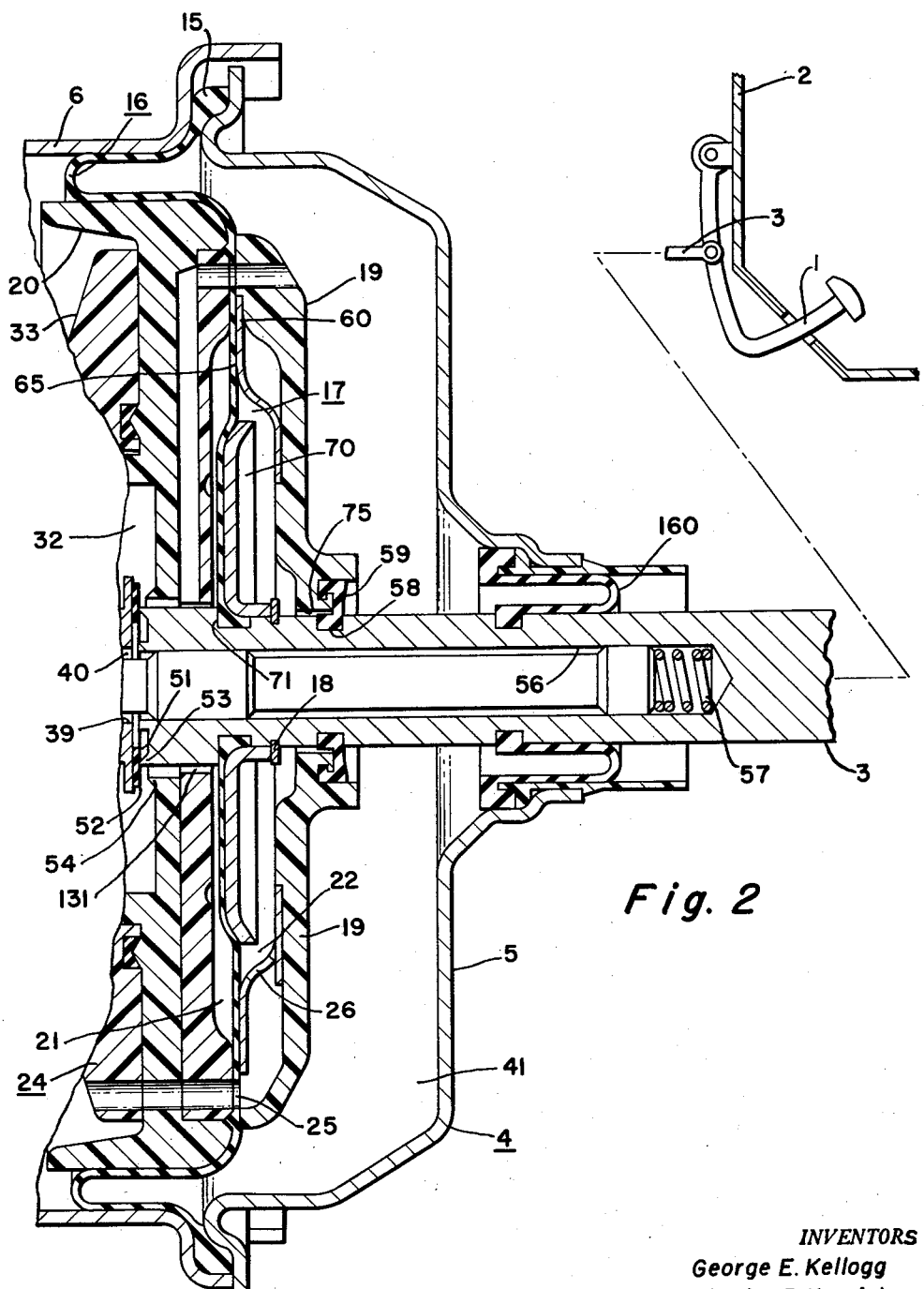
Figure 3:
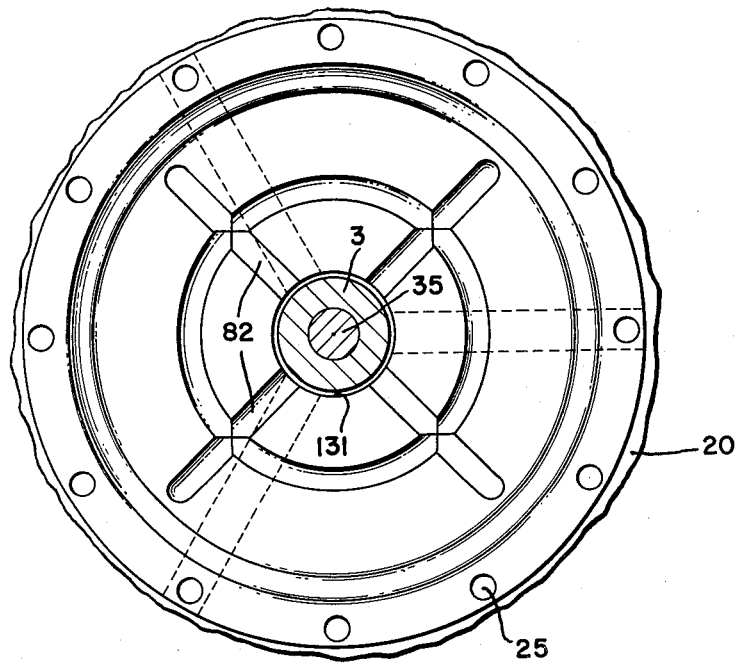
Figure 4:
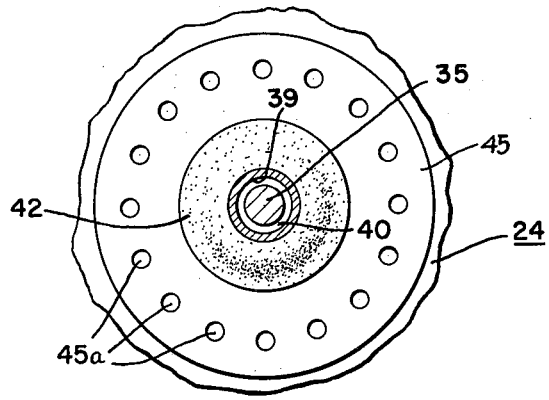

In the drawings:
FIGURE 1 is a cross-section view of the booster unit and the master cylinder.
FIGURE 2 is a cross-section view of a booster unit disclosing a means for transmitting a smaller reaction force for a brake pedal having a lower mechanical advantage.
FIGURE 3 is a cross-section taken on line 3—3 of FIGURE 1.
FIGURE 4 is a cross-section taken on line 4—4 of FIGURE 1.

Referring to FIGURE 1, the brake pedal 1 is pivotally mounted on the chassis 2 and pivotally connected to the air valve 3. The low pressure air valve 3 extends into an opening in the rearward end of the booster unit 4. Booster unit 4 includes a rearward casing section 5 and a forward casing section 6 which supports a master cylinder 7. The master cylinder 7 receives a master piston 9 having a seal 10 on its forward end. The forward end of the master cylinder receives a check valve assembly 11 which is retained in its position by the spring 12 which biases a seal 10 to its position on the forward end of the master piston 9.

The forward end of the master cylinder 7 is connected by a conduit means 13 to a plurality of vehicle brakes 14.

The booster unit 4 includes the rearward casing 5 and the forward casing section 6 which receive the peripheral bead 15 to form a permanent seal on the outer periphery of a diaphragm 16. The diaphragm 16 extends radially inward to form a cylindrical shaped flexing portion to permit the forward movement of the rigid portion of the power wall. The diaphragm 16 extends radially inward through a reaction compartment 17 and is sealed on the outer periphery of the low pressure air valve 3. The reaction plate 70 firmly seats on the bead 71 of the diaphragm 16 and is maintained in this position by the snap ring 18.

The reaction compartment 17 is formed by the reaction housing 19 which is fastened to the diaphragm support 20 to form the reaction compartment 17 with the diaphragm 16 extending through the intermediate portion of the reaction compartment. The reaction plate 70 extends radially outward from the low pressure air valve 3 and contacts the rearward side of the diaphragm 16 to transmit the reaction from the diaphragm to the differential pressure within the compartment. The reaction is transmitted to the low pressure air valve 3.

The diaphragm 16 extending through the intermediate portion of the reaction compartment 17 forms a variable pressure cavity 21 and a constant pressure cavity 22 as a part of the reaction compartment 17. The constant pressure cavity 22 is in communication with the ambient air pressure chamber 23 on the forward side of the power wall 24 through the passage 25 and the opening 26.

The air chamber 23 is in communication with the atmosphere through the vent 27 and the filter 28. The source of pressurized air is fed into the booster unit through the inlet port 29 and the flexible conduit 30. The conduit 30 enters the power wall through the passage 31. The passage 31 feeds through ports 45a of annulus 45 into the pressure cavity 32 adjacent to the floating control valve. The push rod support 33 provides a mounting means for the flexible conduit 30 and supports the push rod 35 which extends into a central opening 36 at the rearward end of the master piston 9.

The air cavity 37 is connected to the air chamber 23 through the plurality of ports 38. The valve seat member 39 is concentrically located about the outer periphery of the push rod 35 providing a passage 40 leading to the forward side of the floating control air valve. When the low pressure air valve member 3 is in spaced relation to its mating seat, a passage means is provided between the variable pressure air chamber 41 and the atmospheric pressure air chamber 23.

The push rod support 33 also forms a supporting means for the valve seat member 39. The valve seat member 39 is supported on its outer periphery by the valve seat member diaphragm 42. The valve seat member diaphragm 42 has a peripheral bead 43 received within the recess 44 of the push rod support. The annulus 45 seats the peripheral bead 43 when the diaphragm support 20 is fastened to the push rod support 33. The forward side of the valve seat member diaphragm 42 is reinforced by the disk 46. The valve seat member diaphragm 42 extends radially inward to form a second peripheral bead 47, which is retained in the annular recess 48 of the valve seat member. The inner peripheral bead 47 of the valve seat member 42 is retained in this position by the spring seat 49 maintained in this position by the biasing force of the spring 50.

The spring 50 biases the valve seat member to a rearward position. The valve seat member carries an annulus 51 which forms the low pressure valve seat 53 and the high pressure valve seat 52. The high pressure valve seat is biased to a contacting position with the high pressure valve element 54. The high pressure valve element 54 is formed by an annular ridge extending forwardly on the inner periphery of the diaphragm support 20.

The push rod 35 extends rearwardly from the central opening 36 in the master piston 9 and is received within the push rod support 33. The rearward end of the push rod 35 is received within the central opening 56 of the low pressure air valve 3 which biases the air valve 3 in spaced relation to the air valve seat 53 in its normally retracted position. The outer periphery of the low pressure air valve 3 contains an annular recess 58 for reception of the inner periphery of the boot 59. A second boot 160 forms a seal on the rearward end of the air valve 3 and the rearward casing section 5 of the booster unit 4. The reaction compartment 17 forms the constant pressure chamber 22 and the variable pressure chamber 21 through the separation by the diaphragm 16 through the intermediate portion. The reaction force transmitted to the manually operated means is created within the variable pressure chamber 21 due to the differential pressure created within the variable pressure cavity 21 and the constant pressure cavity 22. The diaphragm moves rearwardly to bias the reaction plate 70 through the snap ring 18 to the low pressure air valve 3. It can be seen that the diameter of the reaction plate 70 controls the amount of force for a given differential pressure which is transmitted to the low pressure air valve 3. With a smaller diameter reaction plate 70, a smaller reaction force will be transmitted.

The diaphragm backing plate 60 controls the effective area on the diaphragm 16 for transmitting the force to the plate 70. In other words, it can be seen with a smaller diameter of the effective reaction compartment 22 a smaller effective force will be transmitted to the reaction plate 70. By increasing the planar area 65 on the forward side of the diaphragm backing plate 60 a smaller effective area is realized for transmitting the force from the diaphragm 16 to the reaction plate 70. The diaphragm support 20 has a slightly larger inner periphery than the outer periphery of the air valve 3 to permit limited passage of air pressure to the radially extending passages 25 on the forward side of the diaphragm 16. The limited passage of the air provides a delayed reaction on the diaphragm. The degree of pressurization within the variable pressure cavity 21 controls the degree of force transmitted to the reaction plate 70 and thence rearwardly to the manually operated control means.

The operation of the booster unit will be described in the following paragraphs.

The booster unit as disclosed in the drawings is intended to be air suspended at a pressurization of atmospheric pressure. The booster unit is operated by pressurized air at approximately 25 pounds per square inch. The pressurized air is permitted to pass into the flexible hollow conduit 30 to the forward side of the power wall 24 by the valve means within the power wall. The power wall is biased to its normally retracted position in response to the biasing force of the spring 80. In this position, the high pressure air valve is opened and the low pressure valve is closed providing equalization of atmospheric pressure on both sides of the power wall.

As the brake pedal 1 is depressed, the low pressure air valve 3 moves forwardly within the booster unit 4. The low pressure air valve 3 moves forwardly to contact the low pressure air valve seat 53 formed on the annulus 52. In this position, both the low pressure air valve and the high pressure air valve are closed.

Further forward movement of the low pressure air valve 3 biases the valve seat member 39 to an axially forward position. The forward movement of the low pressure air valve 3 unseats the high pressure valve seat 52 from the high pressure valve element 54. In this position, the pressurized air within the flexible conduit 30 and the air pressure chamber 32 is permitted to flow through the high pressure air valve to the annular passage 131 and the radial passage 86. The air pressure continues to pass through the axial passage 83 to the variable pressure 41 within the booster unit. With an increase in air pressure in the variable pressure air chamber 41 the power wall moves forwardly thereby pressurizing fluid within the pressurizing chamber 84 of the master cylinder 7. Simultaneously, with the increase in pressure within the air chamber 41, the air is permitted to pass into the variable pressure air cavity 21 through the clearance passage within the inner periphery of the diaphragm support and the outer periphery of the low pressure air valve 3. The increase in air pressure within the variable pressure cavity 21 in the reaction compartment 16 biases the diaphragm to a rearward position forcing the reaction plate 70 rearwardly and creating a force against the low pressure air valve 3. The reaction force from the reaction compartment on the reaction plate 70 is in direct proportion to the increasing pressure within the variable pressure cavity 21. As the pressure increased within the variable air pressure cavity 21, the reaction force transmitted to the manually operated means also increases in the same proportion.

As the brakes are released, the brake pedal 1 moves rearwardly permitting the low pressure air valve 3 to move rearwardly due to the biasing force of the spring 57 operating against the push rod 35. The spring 50 also biases the valve seat member 39 rearwardly until the annulus 52 contacts the high pressure air valve element 54. In this position, the low pressure air valve 3 and the high pressure air valve element 54 are both contacting their mating seats on the annulus 51. This is the hold position for the booster unit wherein no increase or decrease in pressure is present in either the cavities or the air chambers within the booster unit. The brake actuating force on the vehicle brakes is maintained at a constant pressure due to the stationary position of the master piston 9 within the master cylinder 7.

A further rearward movement of the low pressure air valve 3 permits the opening of the low pressure air valve 3 from the low pressure valve seat 53. This permits a movement of air from the variable pressure air chamber 41 from behind the power wall 24 through the passages 83, 86 and 131 to the air chamber 37, and then to the forward side of the power wall to the air chamber 23. With an equalization of the air pressure within the air chamber 41 and the chamber 23, the power wall is biased to a rearwardly retracted position by the force of the spring 80. The low pressure air valve 3 is biased in spaced relation to the air valve seat 53 on the annulus 52 thereby maintaining communication between the air chamber 41 and the air chamber 23.

In the process of equalizing the pressure within the chamber 41 and the air chamber 23, the air pressure within the variable pressure cavity 21 also equalizes with the pressure in the air in chamber 23. This decreases the reaction force on the high pressure air valve 3 until the air pressure is equalized between the variable pressure air cavity 21 and the constant pressure air cavity 22. In this position, no reaction force is transmitted to the low pressure valve 3. It is noted that the diameter of the reaction plate 70 bears a direct proportion to the reaction force which is transmitted to the low pressure air valve 3. Referring to FIGURE 2, the reaction plate 70 is reduced in its diameter and accordingly transmits the correspondingly smaller force to the high pressure air valve 3. It is also noted that the diaphragm backing plate is formed with the larger planar surface 65 thereby reducing the active area on the diaphragm 16 as it operates in response to the variable pressure in the variable pressure air chamber 21. The force transmitted to the low pressure air valve may be easily controlled by providing replaceable reaction plates and diaphragm backing plates as shown in FIGURE 2 of the drawings. This provides a convenient means for adapting this booster to various types of pedals having different mechanical advantages and also providing the right reaction force as desired by the operator of the vehicle. It can also be seen that the rigid plastic portion of the power wall adapts itself readily to this type of a reaction means wherein the reaction force is transmitted to the diaphragm due to the differential pressure within the reaction compartment. The reaction force is then transmitted to the low pressure air valve 3 to provide the desired reaction to the vehicle brakes.

Further objects and advantages of the present invention will be apparent from the following description, reference being had to the accompanying drawings, wherein a preferred embodiment of the present invention is clearly shown.

What is claimed is as follows:

1. A brake booster unit comprising in combination, a booster unit casing, a diaphragm sealed on its outer periphery by said booster unit casing and having an outer annulus portion providing powder wall means in said casing forming a constant pressure chamber in communication with the atmosphere and a variable pressure chamber in controlled communication to the source of pressurized air through a valve means, plastic wall means secured to said diaphragm and forming a rigid center portion of said power wall means, valve means concentrically located within said power wall, a reaction compartment concentrically formed within said plastic wall means receiving an inner annulus portion of said diaphragm through the intermediate portion of said compartment to form a constant pressure cavity and a variable pressure air cavity, said constant pressure air cavity being in communication with said constant pressurechamber in said booster unit, said variable pressure air cavity in communication with said source of pressurized air through said valve means, a manually controlled valve member, a reaction plate abutting the inner annulus portion of said diaphragm and connected to said valve member for operating said valve means and controlling communication between said source of pressurized air with said variable pressure chamber in said booster unit and said variable pressure cavity in said reaction compartment to thereby provide a reaction means in response to the pressurization and the actuation of said booster unit.

2. A brake booster unit comprising in combination, a power wall having a diaphragm sealed on its outer periphery by the booster unit casing and forming a constant pressure chamber and a variable pressure chamber, plastic wall means forming the central portion of said power wall, valve means centrally located within said power wall, said constant pressure chamber in communication with the atmosphere, said variable pressure chamber in controlled communication through said valve means with a source of pressurized fluid, a reaction compartment formed in said plastic wall means for receiving said diaphragm through the intermediate portion of said reaction compartment to form a variable pressure reaction cavity and a constant pressure reaction cavity, said constant pressure reaction cavity being in communication with said constant pressure chamber, said variable pressure reaction cavity in controlled communication through said valve means to said source of pressurized air to form a reaction on said diaphragm in response to the pressurization of the air in said variable pressure chamber, a reaction member abutting said diaphragm and connected to a manually operated valve operating means, a replaceable diaphragm backing plate for controlling the effective area of said diaphragm within said reaction compartment and the magnitude of the reaction force transmitted to said manually operated member.

3. A brake booster unit comprising in combination, a casing, a power wall having a diaphragm sealed on its outer periphery by the booster unit casing and forming therein a constant pressure chamber and a variable pressure chamber, plastic wall means forming the central portion of said power wall, valve means within said power wall, said constant pressure chamber in communication with the atmosphere, said variable pressure chamber in controlled communication through said valve means with a source of pressurized fluid, a reaction compartment formed within said plastic wall means for receiving said diaphragm through the intermediate portion of said reaction compartment, said diaphragm forming a constant pressure cavity and a variable pressure cavity in said reaction compartment, a replaceable diaphragm backing plate forming a portion of the wall in said constant pressure cavity to control the effective reaction area of said diaphragm, a reaction plate adjacent to the rearward side of said diaphragm for receiving a reaction force in response to the pressurization in said variable pressure cavity, a manually operated valve member connected to said reaction plate for operating said valve means and receiving the reaction force from said reaction plate in response to the degree of pressurization within said reaction compartment.

4. A brake booster unit comprising in combination, a casing, a power wall having a diaphragm sealed on its outer periphery by the booster unit casing and forming therein a constant pressure chamber and a variable pressure chamber, rigid wall means forming the radial central portion of said power wall, valve means located in said wall means, said constant pressure compartment in communication with the atmosphere, said variable pressure chamber in controlled communication with a source of pressurized fluid through said valve means, a reaction compartment formed in said wall means for reception of said diaphragm through the intermediate portion of said reaction compartment to form a variable pressure cavity and a constant pressure cavity, said variable pressure cavity in controlled communication with said source of pressurized fluid through said valve means, said constant pressure compartment in communication with said constant pressure chamber in said booster unit, a replaceable insert forming a diaphragm backing plate to control the effective area of reaction transmitted from said diaphragm within said reaction compartment, a replaceable reaction plate for receiving the reaction force from said diaphragm, a manually operated valve member connected to said reaction plate for operating said valve means and receiving the reaction force to transmit said force to said manually operated member when said booster unit is in operation.

5. A brake booster unit comprising in combination, a casing, a power wall having a diaphragm sealed on its outer periphery by the booster unit casing and forming therein a constant pressure chamber and a variable pressure chamber, rigid wall means forming the radial central portion of said power wall, valve means formed in said wall means, said constant pressure chamber in communication with the atmosphere, said variable pressure chamber in controlled communication to a source of pressurized fluid through said valve means, a reaction compartment formed within said wall means for reception of said diaphragm through the intermediate portion of said reaction compartment to form a constant pressure cavity and a variable pressure cavity, said constant pressure cavity in constant communication with said constant pressure chamber, said variable pressure chamber in controlled communication with said source of pressurized fluid through said valve means, a manually operated valve member for controlling the operation of said valve means, a replaceable diaphragm backing plate having a planar surface engaging the rearward side of said diaphragm in said reaction compartment for controlling the effective reaction area of said diaphragm in said reaction compartment, a replaceable reaction plate mounted on said air valve member contacting said diaphragm for transmitting a reaction force in response to the pressurization within said variable pressure cavity when said vehicle brakes are operated.

6. A brake booster unit comprising in combination, a power wall having a diaphragm sealed on its outer periphery by the booster unit casing and forming a constant pressure chamber and a variable pressure chamber, plastic wall means forming the central rigid portion of said power wall, a valve means received concentrically within said wall means, said constant pressure chamber in communication with the atmosphere, said variable pressure chamber in controlled communication through the valve means to the source of pressurized fluid, a reaction compartment formed within said wall means for reception of the central portion of said diaphragm thereby forming a constant pressure cavity and a variable pressure cavity, said variable pressure cavity in constant communication with said constant pressure chamber, said variable pressure cavity in controlled communication with said source of pressurized fluid through said valve means, a replaceable reaction plate of selective predetermined diameter abutting the rearward side of said diaphragm in said reaction compartment, a replaceable diaphragm backing plate having a selective predetermined planar surface to regulate the effective area of said diaphragm operated within said reaction compartment thereby controlling the reaction transmitted to said reaction plate, an air valve member for operating said valve means and receiving the reaction force from said reaction plate in direct response to the degree of pressurization within said variable pressure cavity in said variable pressure chamber.

7. A brake booster unit comprising in combination, a power wall having a diaphragm sealed on its outer periphery by the booster unit casing and forming a constant pressure chamber and a variable pressure chamber, plastic wall means forming the central portion of said power wall, valve means located concentrically within said plastic wall means, said constant pressure chamber in communication with the atmosphere, said variable pressure chamber in controlled communication with a source of pressurized fluid, a reaction compartment formed within said plastic wall means and receiving the inner periphery of said diaphragm separating the interior portion of said reaction compartment into a constant pressure cavity and a variable pressure cavity, said constant pressure cavity in constant communication with the constant pressure chamber, said variable pressure cavity in controlled communication with said source of pressurized fluid through said valve means, a replaceable reaction plate having a selective predetermined diameter to transmit a predetermined reaction force, a replaceable diaphragm backing plate forming a portion of the wall of said variable pressure cavity, said diaphragm backing plate having a planar surface of selectively changeable area which controls the reaction transmitted to said reaction plate, and a valve member for operating said valve means connected to said reaction plate to transmit a reaction force in direct proportion to the degree of pressurization within said variable pressure cavity and said variable pressure chamber when said booster unit is in operation.

8. A brake booster unit comprising in combination, a power wall having a diaphragm sealed on its outer periphery by a booster unit casing forming a constant pressure chamber and a variable pressure chamber, a plastic wall means forming the central portion of said power wall connected to said diaphragm, valve means concentrically located within said plastic wall means, a reaction compartment formed within said plastic wall means for reception of the inner periphery of said diaphragm, said diaphragm forming a constant pressure cavity and a variable pressure cavity, said variable pressure cavity having a portion of the wall formed by a replaceable diaphragm backing plate, said replaceable diaphragm backing plate having a selective planar surface abutting the rearward side of said diaphragm the area of which controls the effective area of said diaphragm for transmitting reaction force, a replaceable reaction plate of selective diameter concentrically located within said reaction compartment the area of which controls the reaction force transmitted from said reaction compartment, a valve member connected to said reaction plate for operating said valve means and adapted for transmitting a reaction force to the manually operating means in response to the pressurization in said variable pressure chamber when said booster unit is in operation.

References Cited in the file of this patent

UNITED STATES PATENTS

| | | |
|---|---|---|
| 2,818,710 | Price | Jan. 7, 1958 |
| 2,822,782 | Hupp | Feb. 11, 1958 |
| 2,842,101 | Price | July 8, 1958 |
| 2,876,627 | Ayers | Mar. 10, 1959 |
| 2,953,120 | Ayers | Sept. 20, 1960 |